United States Patent
Teh

(10) Patent No.: US 11,031,708 B2
(45) Date of Patent: Jun. 8, 2021

(54) BOARD EDGE CONNECTOR

(71) Applicant: Molex, LLC, Lisle, IL (US)

(72) Inventor: Chien-Ching Teh, Jurong Town (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/802,548

(22) Filed: Feb. 26, 2020

(65) Prior Publication Data
US 2020/0274269 A1   Aug. 27, 2020

(30) Foreign Application Priority Data

Feb. 27, 2019   (CN) .......................... 201910145456.X

(51) Int. Cl.
*H01R 12/70* (2011.01)
*G06F 1/18* (2006.01)

(52) U.S. Cl.
CPC .......... *H01R 12/7023* (2013.01); *G06F 1/185* (2013.01); *H01R 12/7047* (2013.01); *H01R 12/7064* (2013.01)

(58) Field of Classification Search
CPC .............. H01R 12/707; H01R 12/7023; H01R 12/7052; H01R 12/7064; H01R 12/7082; H01R 12/7088; H01R 12/721; H01R 12/725; H01R 12/732; H01R 12/737; H01R 13/6461; H05K 7/1431; G06F 1/185
See application file for complete search history.

(56) References Cited

U.S. PATENT DOCUMENTS

| | | | |
|---|---|---|---|
| 4,307,927 A | 12/1981 | Mollman | |
| 5,632,649 A | 5/1997 | Spangler | |
| 5,769,668 A | 6/1998 | Tondreault | |
| 6,017,248 A * | 1/2000 | Pan | H01R 12/7005 439/681 |
| 6,466,452 B2 | 10/2002 | Yamada et al. | |
| 6,540,539 B2 | 4/2003 | Yahiro et al. | |
| 7,556,527 B2 | 7/2009 | Li et al. | |
| 7,699,644 B2 * | 4/2010 | Szczesny | H01R 12/7005 439/377 |
| 10,020,603 B1 | 7/2018 | Liu et al. | |

(Continued)

FOREIGN PATENT DOCUMENTS

CN   2261096 Y   8/1997
CN   2266815 Y   11/1997
(Continued)

*Primary Examiner* — Edwin A. Leon
*Assistant Examiner* — Matthew T Dzierzynski

(57) ABSTRACT

A board edge connector is provided. The board edge connector includes an insulating housing, a plurality of terminals and a metal keycap. The insulating housing includes a board edge slot and at least one key integrally configured in the board edge slot. The key includes a top portion and two surfaces opposite to each other. A plate body receiving portion is provided alongside each of the two surfaces of the key. The plate body receiving portion includes a holding recess. The metal keycap includes plate bodies respectively received in the two-plate body receiving portions and an elastic holding arm positioned on at least one side of the plate body. The elastic holding arm latches to the holding recess of the plate body receiving portion. Therefore, the metal keycap can protect and prevent the key from being damaged or generating debris due to hit.

9 Claims, 10 Drawing Sheets

(56) References Cited

U.S. PATENT DOCUMENTS

| | | | | |
|---|---|---|---|---|
| 10,224,653 B2* | 3/2019 | Niu | ................. | H01R 13/645 |
| 2007/0155245 A1* | 7/2007 | Tsai | ................. | H01R 12/7005 |
| | | | | 439/637 |
| 2020/0335890 A1* | 10/2020 | Liu | ................. | H01R 12/7064 |

FOREIGN PATENT DOCUMENTS

| | | | |
|---|---|---|---|
| CN | 1187058 | A | 7/1998 |
| CN | 2368187 | Y | 3/2000 |
| CN | 2383223 | Y | 6/2000 |
| CN | 101719607 | A | 6/2010 |
| CN | 202454775 | U | 9/2012 |
| CN | 106299777 | A | 1/2017 |
| CN | 108346881 | A | 7/2018 |
| EP | 0578881 | A1 | 1/1994 |
| JP | 5064040 | B2 | 10/2012 |
| TW | M574773 | U | 2/2019 |

\* cited by examiner

BOARD EDGE CONNECTOR

RELATED APPLICATIONS

This application claims priority to Chinese Application No. 201910145456.X, filed Feb. 27, 2019, which is incorporated herein by reference in its entirety.

TECHNICAL FIELD

The present disclosure relates to an electrical connector, and more particularly, the present disclosure relates to a board edge connector with a metal keycap.

BACKGROUND

Generally, as for a plastic key of a board edge connector, in the process of mating a board, especially when the board is blindly mated, the board edge often hits the plastic key, which causes damage of the plastic key, or generates debris which fall into the slot of the board edge connector, thereby hindering mechanical and electrical contact.

U.S. Pat. No. 6,540,539 (corresponding to Taiwanese patent application publication No. TW492217) discloses a connector using a metal key. An insulator housing of the connector has an elastic member made of a metal material. The elastic member is a separate component and fixed to the insulator housing. The elastic member has a pair of spring portions. When a small board is inserted into the connector, the spring portions are inserted into a key groove of the small board to exhibit the function of the key. Although the key made of metal can solve the problem caused by the key made of plastic, the elastic member as the key disclosed in the patent performs interference fixing basically by using that a barb bits into an inner wall of the insulator housing. As known in the art, due to limitation from the structure of the barb, the interference fixing force provided by the barb is limited. Therefore, when the key made of metal is subjected to frequent hits, the key which is made of metal and uses a barb is still loosened and separated from the insulator housing.

The above description merely provides a background, and it is not admitted that the above description discloses the subject matter of the present disclosure, does not constitute the background of the present disclosure, and any above description should not be considered as any part of the present disclosure.

SUMMARY

An embodiment of the present disclosure provide a board edge connector. The board edge connector comprises an insulating housing, a plurality of terminals and a metal keycap. The insulating housing has an elongated shape extending in a length direction and comprising a board edge slot extending in the length direction, two side walls extending in the length direction and forming the board edge slot and at least one key integrally configured in the board edge slot and extending in a width direction. The key comprises a top portion and two surfaces opposite to each other in the length direction. A plate body receiving portion is provided alongside each of the two surfaces of the key. The plate body receiving portion comprises a holding recess. The plurality of terminals are mounted in the insulating housing. The metal keycap sheathes the key along a downward direction facing the key and comprises a top surface covering the top portion of the key, plate bodies respectively received in the two plate body receiving portions and an elastic holding arm positioned on at least one side of the plate body. The elastic holding arm latches to the holding recess of the plate body receiving portion.

In some embodiments, the holding recess of the plate body receiving portion comprises a holding shoulder. The holding shoulder is positioned in the holding recess and faces downwardly, the elastic holding arm of the metal keycap is a single cantilever structure with a lower end connected to a side edge of the plate body of the metal keycap and extending obliquely upwardly. A tip of the elastic holding arm is a holding end facing upwardly. The holding end is latched to the holding shoulder in the holding recess of the plate body receiving portion.

In some embodiments, the plate body receiving portion of the insulating housing comprises guide grooves. The guide grooves are provided on the side walls, two sides of the plate body of the metal keycap are respectively positioned in the guide grooves, and the holding recess of the plate body receiving portion is provided in the guide groove of the plate body receiving portion.

In some embodiments, the guide groove has an open end facing upwardly. The open end comprises a first guide surface and a second guide surface. The first guide surface is an oblique surface and is configured to guide the elastic holding arm of the metal keycap in the width direction. The second guide surface is an oblique surface and is configured to guide the plate body of the metal keycap in the length direction.

In some embodiments, the holding recess of the plate body receiving portion penetrates the side wall of the insulating housing.

In some embodiments, the plate body receiving portion of the insulating housing further comprises a fixing recess which is provided to a bottom portion of the plate body receiving portion of the insulating housing. The metal keycap of plate body comprises a fixed portion which interference fixes with the fixing recess of the plate body receiving portion.

In some embodiments, the board edge slot comprises an inner bottom surface, the fixing recess of the plate body receiving portion comprises a bottom edge, and the plate body of the metal keycap comprises a bottom edge. The bottom edge of the fixing recess of the plate body receiving portion and the bottom edge of the plate body of the metal keycap extend beyond the inner bottom surface of the board edge slot.

In some embodiments, the fixed portion comprises interference protrusions which interference fix with a wall surface of the fixing recess of the plate body receiving portion.

In some embodiments of the present disclosure, a total width of the fixed portion of the metal keycap in the width direction is smaller than a distance between the holding ends of the elastic holding arms on the two sides of the plate body.

In the present disclosure, the metal keycap sheathes the key, the key is a plastic key. Therefore, the metal keycap can protect and prevent the key from being damaged or generating debris due to hit. In addition, the structural cooperation between the elastic holding arm of the metal keycap and the holding recess of the key can provide the metal keycap with a relatively high holding force to prevent the metal keycap from loosening and separating from the insulating housing.

The technical features and advantages of the present disclosure are widely and generally described as above, so the detailed description of the present disclosure can be better understood. Other technical features and advantages constituting the subject matters of the claims of the present disclosure will be described below. It is to be understood by those of ordinary skill in the art that, the concept and specific embodiments disclosed below may be quite easily used to make modification or design other configuration or process to realize the same objects of the present disclosure. It is to be understood by those of ordinary skill in the art that these equivalent configurations cannot depart from the spirit and scope of the present disclosure as defined by the appended claims.

BRIEF DESCRIPTION OF THE DRAWINGS

Referring to the detailed description and the claims in combination with the drawings, the disclosed contents of the present disclosure can be fully understood, the same reference numeral indicates the same element in the drawings.

DETAILED DESCRIPTION OF THE PREFERRED EMBODIMENTS

Figure 1:
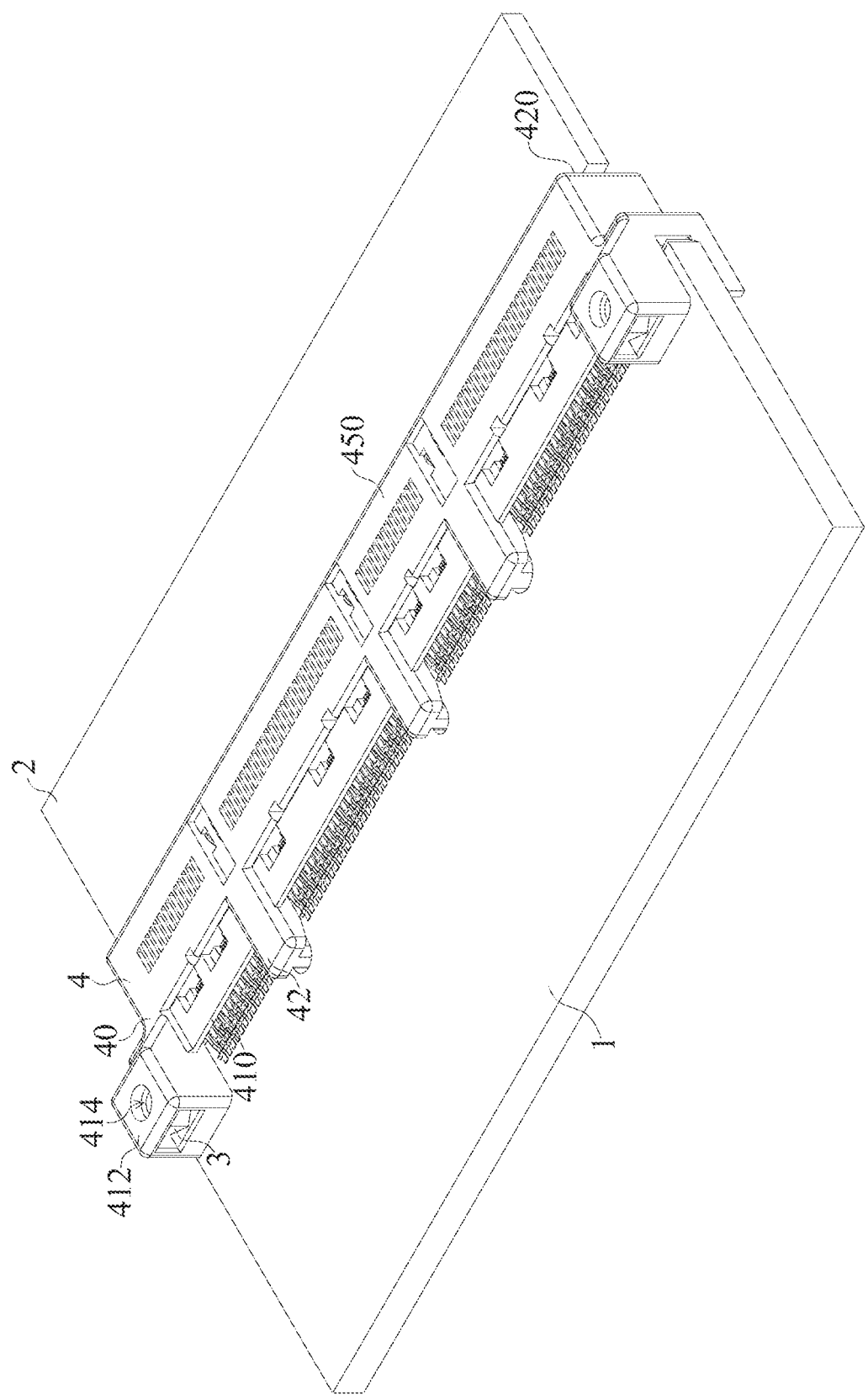
FIG. 1 is an assembled perspective schematic view of a circuit board, a board edge module and a board edge connector.

Embodiments or examples of the content of the present disclosure shown in the drawings are described in a specific language. It is to be understood that this is not intended to limit the scope of the present disclosure. Any variations or modifications of the described embodiments, as well as any further applications of the principles described herein, will normally occur to those skilled in the art. The reference numerals may be repeated in each embodiment, but even if the elements have the same reference numeral, the features in the embodiment are not necessarily used in another embodiment.

It will be understood that the various elements, assemblies, regions, layers or sections may be described herein using the terms first, second, third, etc., however, these elements, assemblies, regions, layers or sections are not limited to these terms. These terms are only used to distinguish one element, assembly, region, layer or section from another element, assembly, region, layer or section. The first element, assembly, region, layer or section described below may be referred to as a second element, assembly, region, layer or section without departing from the teachings of the inventive concept of the present disclosure.

The words used in the present disclosure are only used for the purpose of describing the specific exemplary embodiments and are not intended to limit the concept of the present disclosure. As used herein, "a" and "the" in singular are also used to contain plural, unless otherwise expressly indicated herein. It is to be understood that the word "include" used in the specification specifically indicates the existence of a feature, integer, step, operation, element or assembly which is described, but does not excludes the existence of one or more other features, integers, steps, operations, elements, assemblies or groups thereof.

Figure 2:
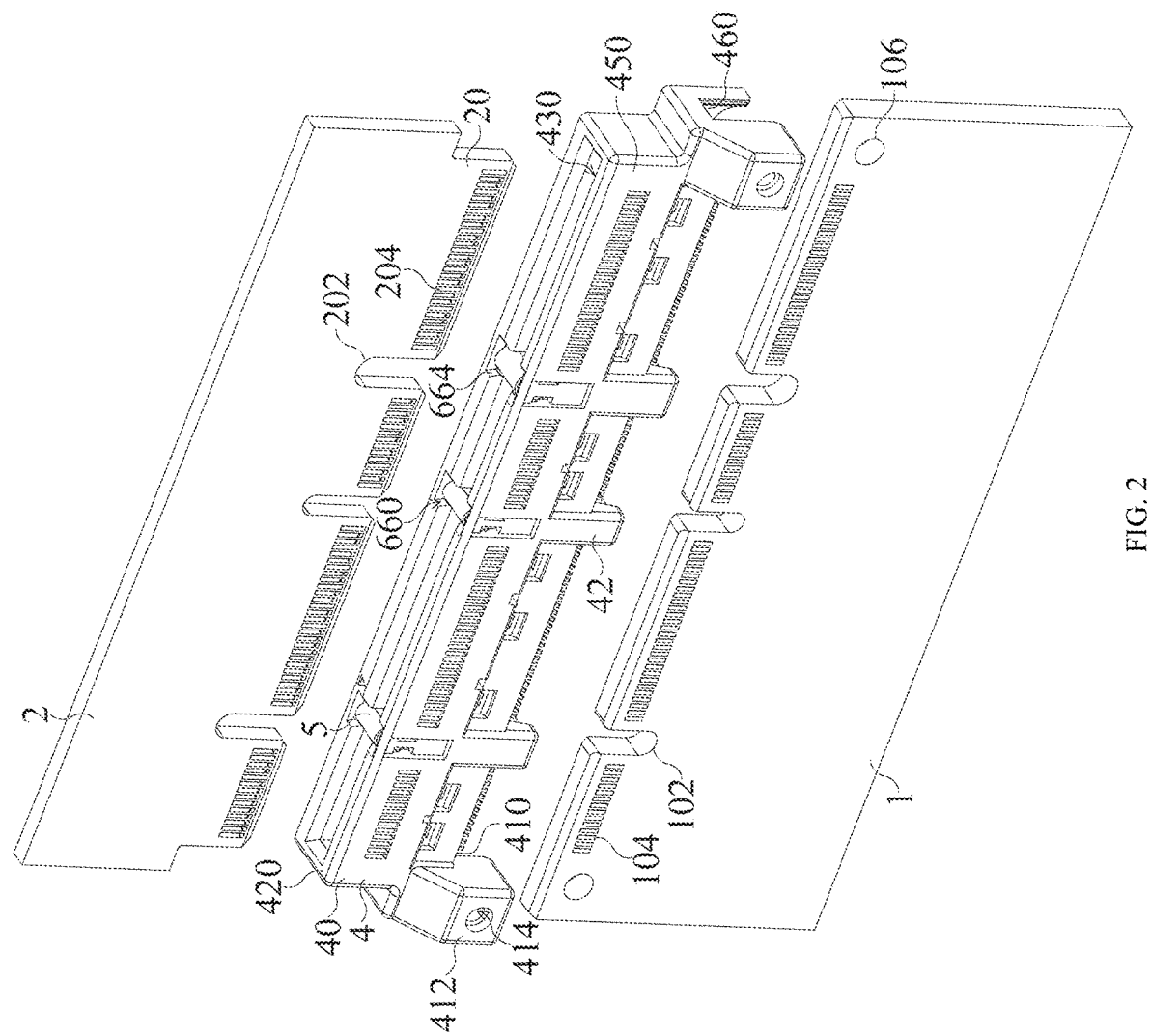
FIG. 2 is an exploded perspective schematic view of the circuit board, the board edge module and the board edge connector of FIG. 1.

FIG. 1 is an assembled perspective schematic view of a circuit board 1, a board edge module 2 and a board edge connector 4. FIG. 2 is an exploded perspective schematic view of the circuit board 1, the board edge module 2 and the board edge connector 4 of FIG. 1. In some embodiments, the circuit board 1 includes a printed circuit board (PCB). The board edge module 2 is inserted into the board edge connector 4. In some embodiments, the board edge module 2 may be an electronic device having a board edge 20 (as shown in FIG. 2) exposed or may be a circuit board.

Figure 3:
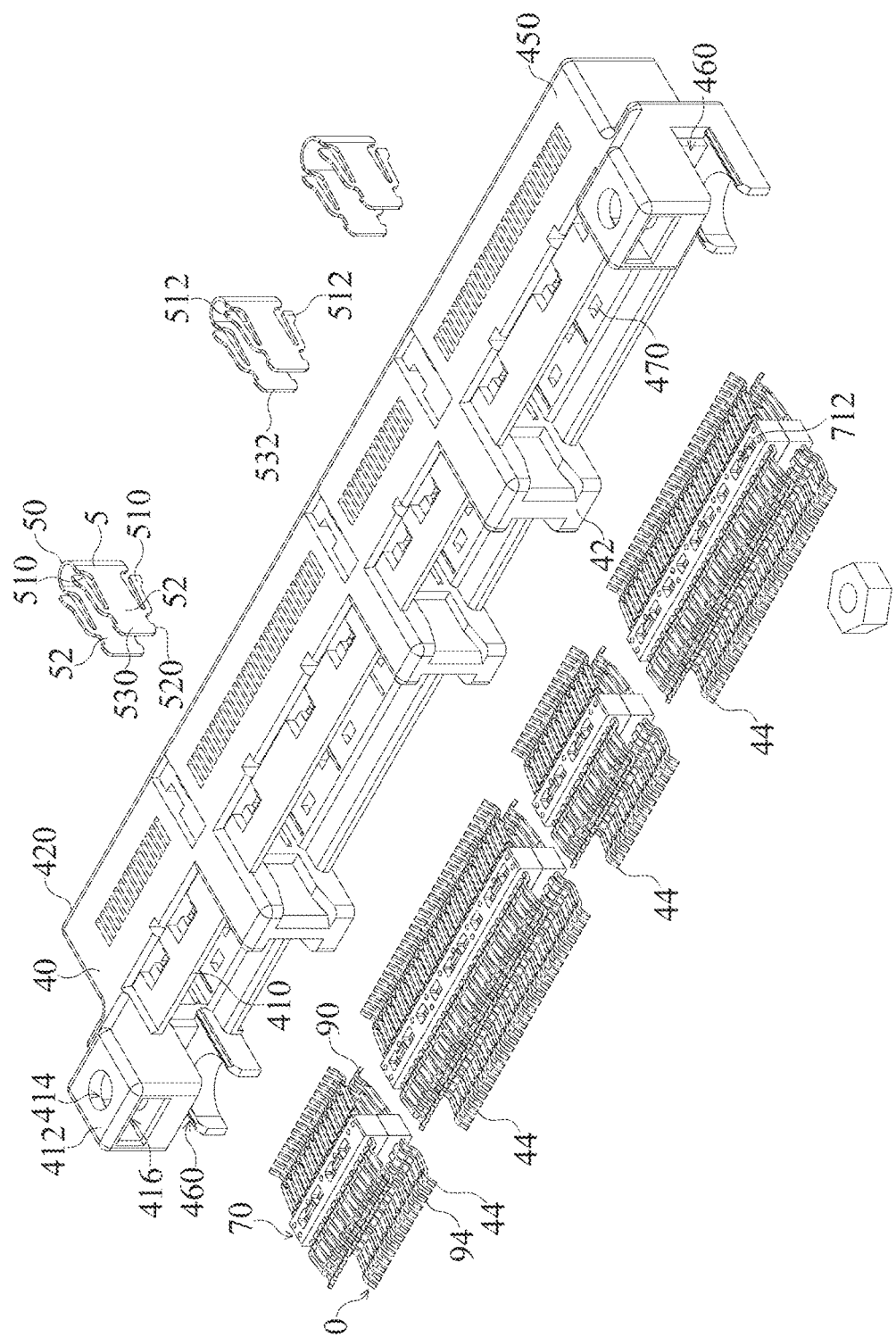
FIG. 3 is an exploded perspective schematic view of the board edge connector of FIG. 2.
Figure 4:
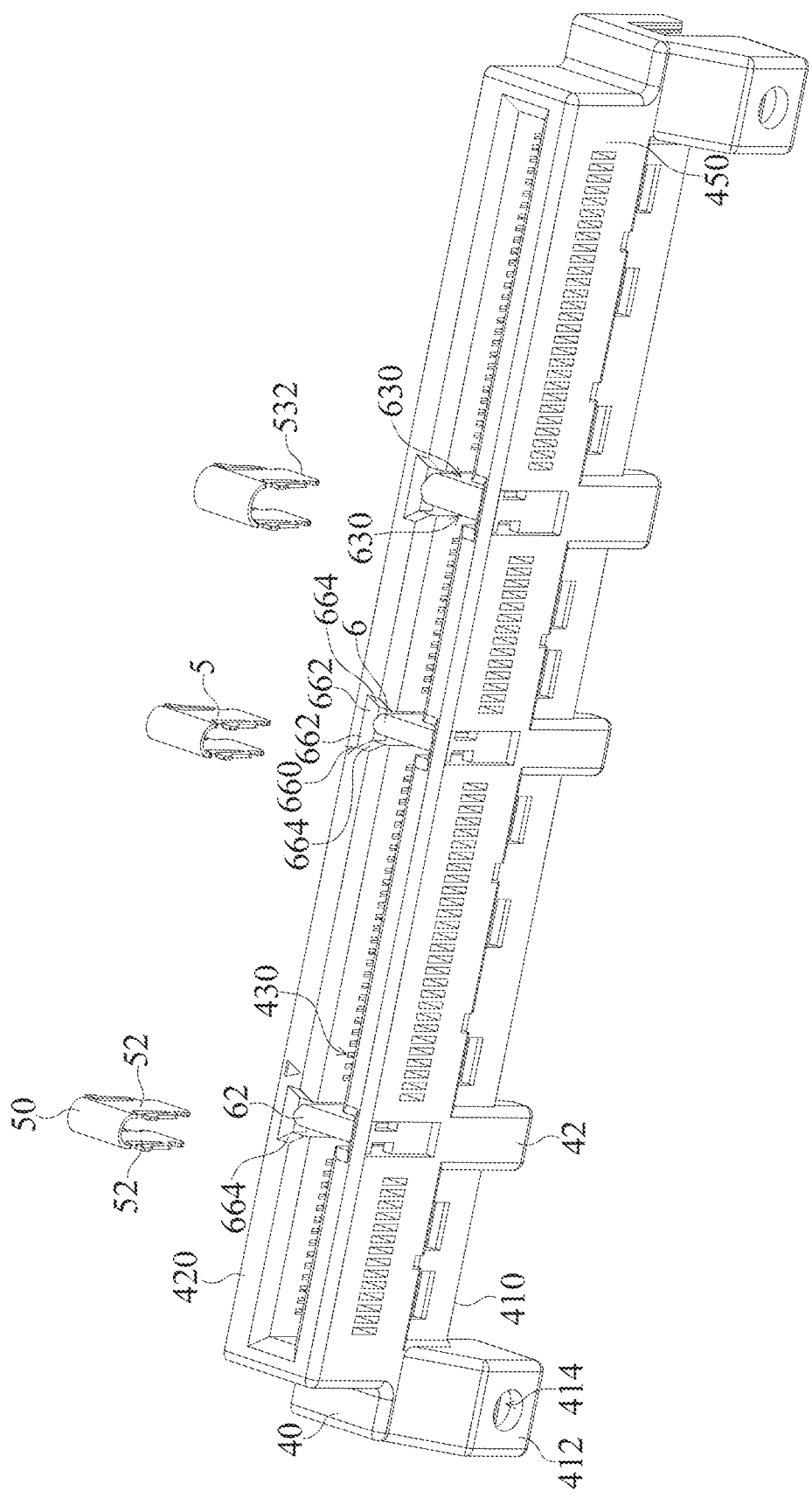
FIG. 4 is an exploded perspective schematic view of the board edge connector of FIG. 3 from another angle with only an insulating housing and a metal keycap of the board edge connector shown.

FIG. 3 is an exploded perspective schematic view of the board edge connector 4 of FIG. 2. FIG. 4 is an exploded perspective view schematic of the board edge connector 4 of FIG. 3 from another angle with only an insulating housing 40 and a metal keycap 5 of the board edge connector 4 shown. Referring to FIG. 3 and FIG. 4, the board edge connector 4 includes an insulating housing 40, a plurality of terminals 44 and a metal keycap 5 mounted in the insulating housing 40.

Figure 7:
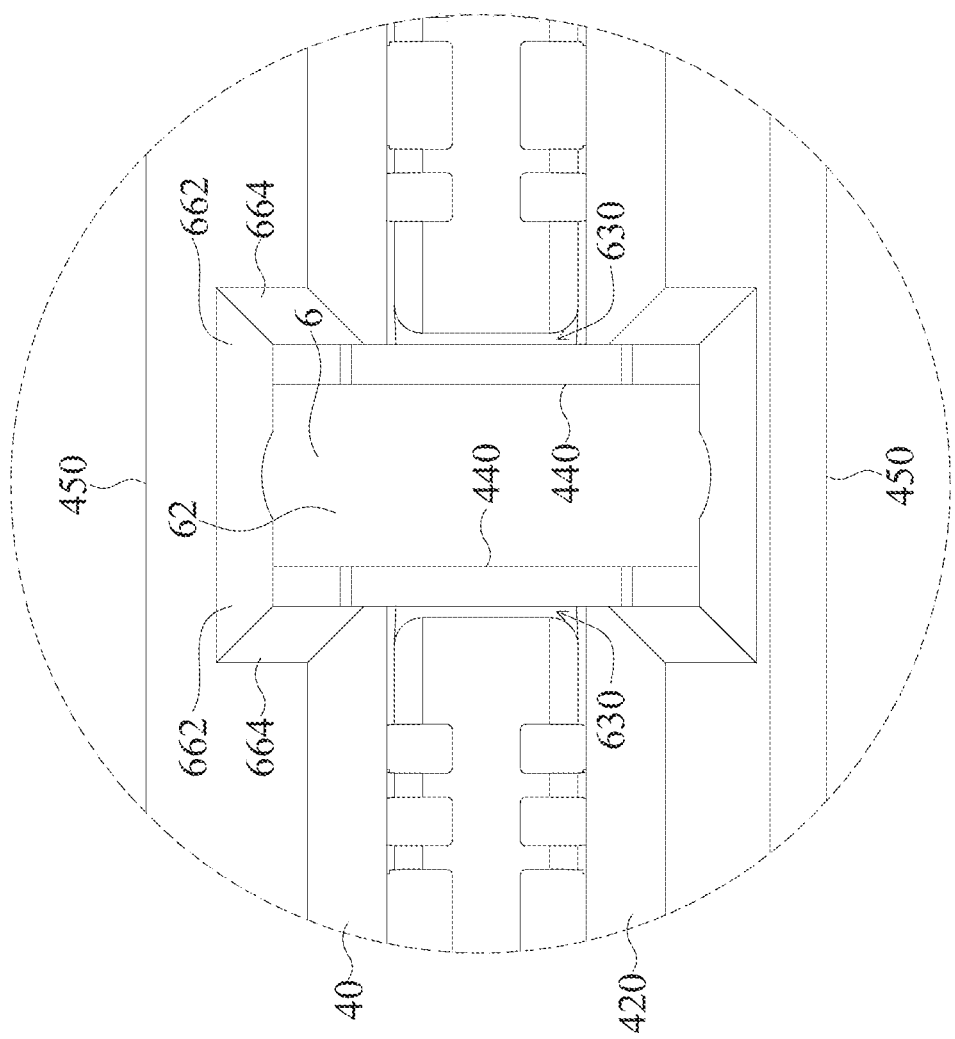
FIG. 7 is a partially enlarged top schematic view of the key of the board edge connector of FIG. 4.

The insulating housing 40 has an elongated shape extending in a length direction. The insulating housing 40 has a mounting face 410 corresponding to the circuit board 1, a mating face 420 corresponding to the board edge module 2, a board edge slot 430 positioned at the mating face 420 and extending in the length direction, two side walls 450 (as shown in FIG. 7) extending in the length direction and forming the board edge slot 430, and at least one key 6 integrally configured in the board edge slot 430 and extending in a width direction; the embodiment includes three keys 6, each key 6 is connected with the two side walls 450 in the width direction, each metal keycap 5 sheathes each key 6. Based on an integral configuration, a material of the key 6 is the same as a material of the insulating housing 40, and the key 6 and the insulating housing 40 are both made of plastic. Each of two ends of the insulating housing 40 along the length direction at the mounting face 410 is provided with a clamping board notch 460 and three alignment blocks 42 are positioned between the clamping board notches 460. Each terminal 44 has a tail portion 94 positioned at the mounting face 410 and an elastic contact portion 90 positioned in the board edge slot 430.

When the board edge connector 4 is electrically and mechanically connected with the circuit board 1, the clamping board notch 460 of the board edge connector 4 receives an edge of the circuit board 1, and the three alignment blocks 42 of the board edge connector 4 each are positioned to the corresponding one of the three positioning notches 102 at the edge of the circuit board 1. In the embodiment, by a screw (not shown) passing through a mounting hole 414 of a mounting portion 412 provided at the mounting face 410 of the insulating housing 40 and a mounting hole 106 of the circuit board 1 and a nut 3 cooperating with the screw, the board edge connector 4 is mounted to the circuit board 1, the mounting hole 414 penetrates the mounting portion 412.

Specifically, each mounting portion 412 includes a receiving chamber 416 for receiving the nut 3 cooperating with the screw. In the embodiment, the tail portion 94 of each terminal 44 can elastically contact a conductive pad 104 provided on corresponding one of two surfaces of the edge of the circuit board 1 when assembling, and can be fixed to the conductive pad 104 by welding in a subsequent manufacturing process. In the embodiment, the board edge connector 4 is mounted to the edge of the circuit board 1 by a straddle mounting manner, however, the mounting manner of the present disclosure is not limited thereto. In some embodiments, the board edge connector 4 can be mounted to the circuit board 1 in a vertical manner, the tail portion 94 of each terminal 44 can be mounted to the circuit board 1 by surface mounting technology (SMT), or can be mounted to the circuit board 1 by through hole technology, press fit technology and on the like.

When the board edge connector 4 is electrically and mechanically connected with the board edge module 2, the board edge module 2 is inserted into the board edge slot 430, and the three metal keycaps 5 of the board edge connector 4 each are positioned to the corresponding one of the three positioning notches 202 of the board edge module 2, and the plurality of conductive pads 204 provided on the two surfaces of the board edge 20 of the board edge module 2 each contact the elastic contact portions 90 of the corresponding terminal 44.

Figure 5:
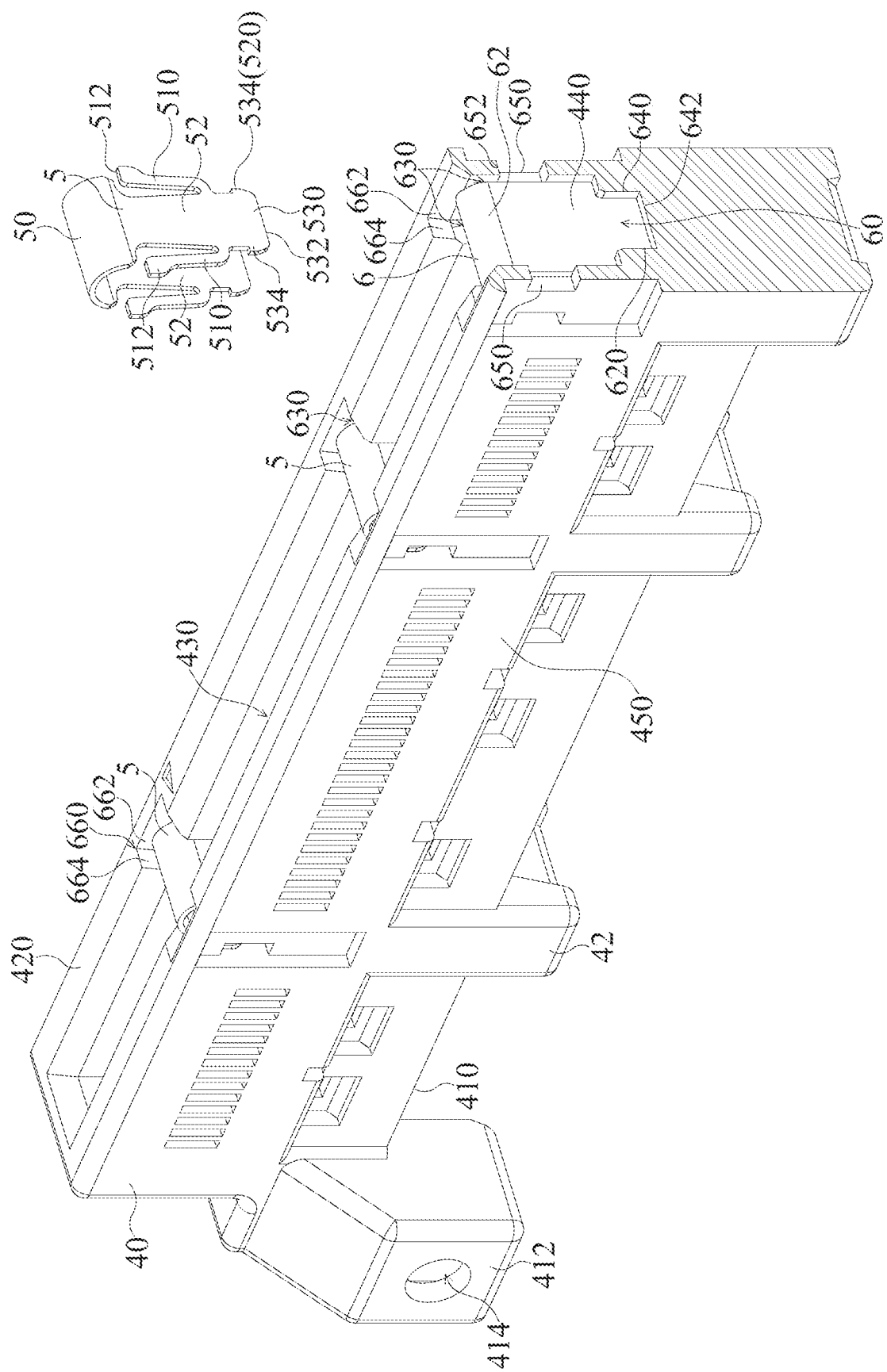
FIG. 5 is an exploded cross-sectional perspective schematic view of the board edge connector of FIG. 4 with only one metal keycap detached from a corresponding key of the insulating housing and the insulating housing cut away.
Figure 6:
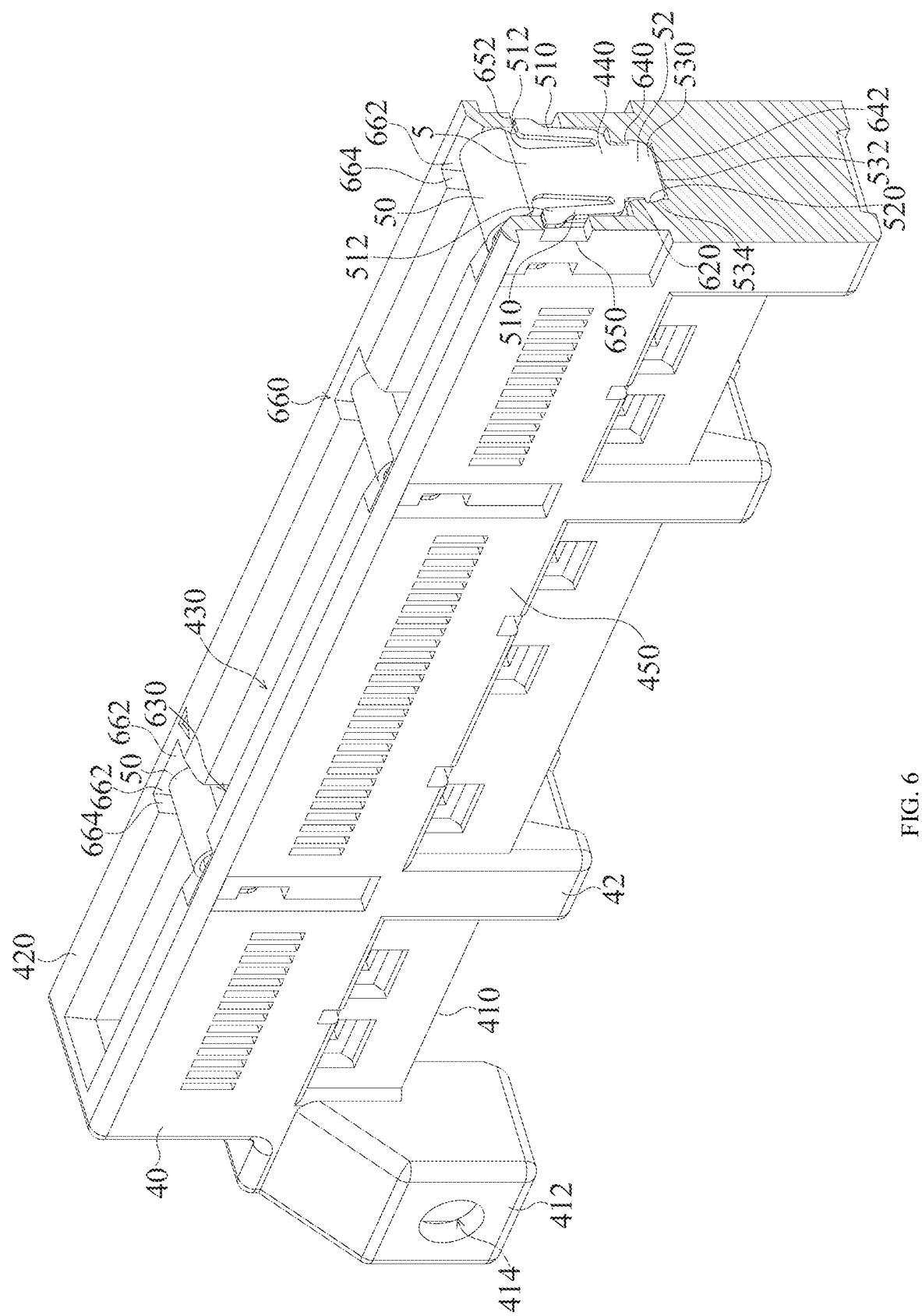
FIG. 6 is an assembled cross-sectional perspective schematic view of the board edge connector of FIG. 5.

FIG. 5 is an exploded cross-sectional perspective schematic view of the board edge connector 4 of FIG. 4 with only one metal keycap 5 detached from one corresponding key 6 of the insulating housing 40 and the other two metal keycaps 5 sheathing the corresponding other two keys 6 in a downward direction facing the keys 6 and with the insulating housing 40 cut away. In the embodiment, the downward direction refers to a direction from the mating face 420 of the insulating housing 40 toward the board edge slot 430 of the insulating housing 40 as shown in FIG. 5. FIG. 6 is an assembled cross-sectional perspective schematic view of the board edge connector 4 of FIG. 5. FIG. 7 is a partially enlarged top schematic view of the key 6 of the board edge connector 4 of FIG. 4.

Referring to FIG. 5, the metal keycap 5 includes an arc top surface 50, two plate bodies 52 connected with each other via top surface 50 and an elastic holding arm 510 positioned on at least one side of the plate body 52. In the embodiment, the two sides of a plate body 52 each include one elastic holding arm 510.

Referring to FIG. 7, the key 6 includes two surfaces 440 opposite to each other in the length direction. Referring back to FIG. 5, the insulating housing 40 is provided with a plate body receiving portion 60 alongside each of the two surfaces 440 of the key 6. Each plate body receiving portion 60 includes a guide groove 630, a fixing recess 640 and a holding recess 650.

Each plate body receiving portion 60 includes two guide grooves 630 which are respectively provided on the side walls 450 and used to guide the plate body 52 of the metal keycap 5 and the elastic holding arms 510 on the two sides. Specifically, each guide groove 630 has an open end 660 facing upwardly, the open end 660 includes a first guide surface 662 and a second guide surface 664. The first guide surface 662 is an oblique surface and is used to guide the elastic holding arm 510 of the metal keycap 5 in the width direction so that the elastic holding arm 510 more smoothly enters into the guide groove 630. The second guide surface 664 is an oblique surface and is used to guide the plate body 52 of the metal keycap 5 in the length direction so that the plate body 52 more smoothly enters into the guide groove 630.

The fixing recess 640 is provided to a bottom portion 620 of the plate body receiving portion 60 of the insulating housing 40, and is used for interference fixing with a fixed portion 520 of a bottom portion 530 of the plate body 52 of the metal keycap 5 provided therein.

The holding recess 650 is used to allow the metal keycap 5 to latch thereon. The holding recess 650 is provided in the guide groove 630 and is recessed toward the side wall 450 from the guide groove 630 and penetrates the side wall 450 of the insulating housing 40. However, the present disclosure is not limited thereto. In some embodiments, the holding recess 650 may not penetrate the side wall 450 of the insulating housing 40.

When mounting, the metal keycap 5 sheathes the key 6 in the downward direction, and the top surface 50 covers an arc top portion 62 of the key 6. In addition, the plate body 52 is received in the plate body receiving portion 60 and two sides of the plate body 52 are positioned in the guide grooves 630.

During the insertion of the plate body 52 of the metal keycap 5 into the guide groove 630, the elastic holding arms 510 on the two sides are elastically compressed inwardly relative to each other by the restriction of the guide grooves 630, when the elastic holding arms 510 on the two sides move into the holding recesses 650, the elastic holding arms 510 elastically splay into the holding recesses 650 respectively, and therefore the elastic holding arms 510 of the metal keycap 5 are held by the holding recesses 650 of the plate body receiving portion 60 respectively. Specifically, the holding recess 650 of the plate body receiving portion 60 includes a holding shoulder 652. The holding shoulder 652 is positioned in the holding recess 650 and faces downwardly; in addition, the elastic holding arm 510 of the metal keycap 5 is a single cantilever structure with a lower end connected to a side edge of the plate body 52 of the metal keycap 5 and extending obliquely upwardly, and a tip of the elastic holding arm 510 is a holding end 512 facing upwardly, the holding end 512 can be latched to the holding shoulder 652 in the holding recess 650 of the plate body receiving portion 60 in an upward direction, therefore the metal keycap 5 is relatively firmly held in the insulating housing 40. In short, the structural cooperation between the elastic holding arm 510 of the metal keycap 5 and the holding recess 650 of the key 6 can provide the metal keycap 5 with a relatively high holding force to prevent the metal keycap 5 from loosening and separating from the insulating housing 40.

In the embodiment, a total width of the fixed portion 520 of the metal keycap 5 in the width direction is smaller than a distance between the holding ends 512 of the elastic holding arms 510 on the two sides of the plate body 52 of the metal keycap 5.

Figure 8:
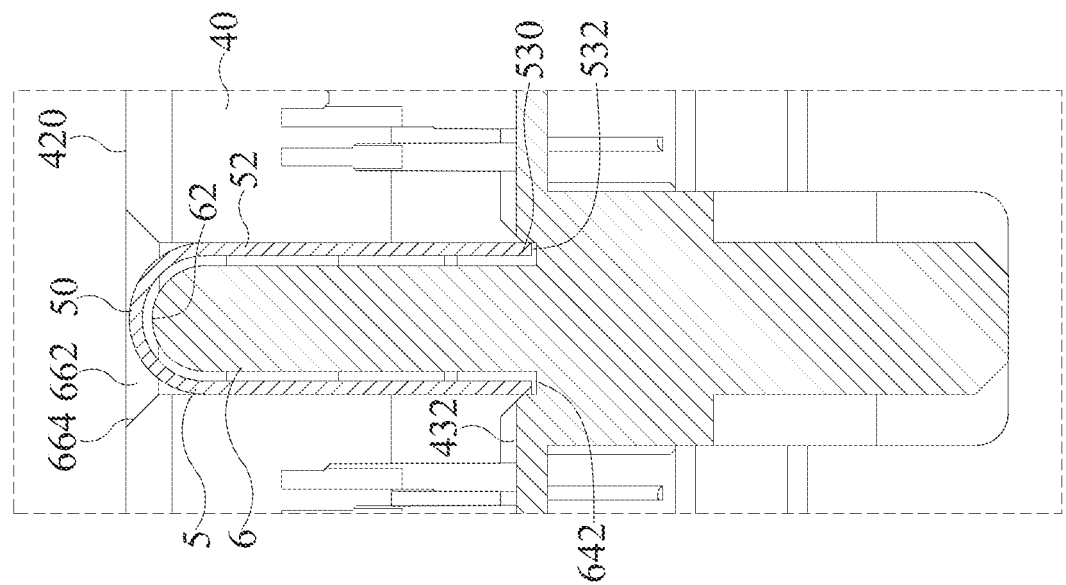
FIG. 8 is a partially cross-sectional plan schematic view of the board edge connector of FIG. 6 taken along a cross-sectional line in a length direction.

FIG. 8 is a partially cross-sectional plan schematic view of the board edge connector 4 of FIG. 6 taken along a cross-sectional line in the length direction. Referring to FIG. 8, the board edge slot 430 includes an inner bottom surface 432, the fixing recess 640 of the plate body receiving portion 60 includes a bottom edge 642, and the bottom portion 530 of the plate body 52 of the metal keycap 5 includes a bottom edge 532. The bottom edge 642 of the fixing recess 640 of the plate body receiving portion 60 and the bottom edge 532 of the plate body 52 of the metal keycap 5 extend beyond the inner bottom surface 432 of the board edge slot 430. Therefore, the holding force between the metal keycap 5 and the insulating housing 40 is relatively high to prevent the metal keycap 5 from loosening and separating from the insulating housing 40.

Figure 9:
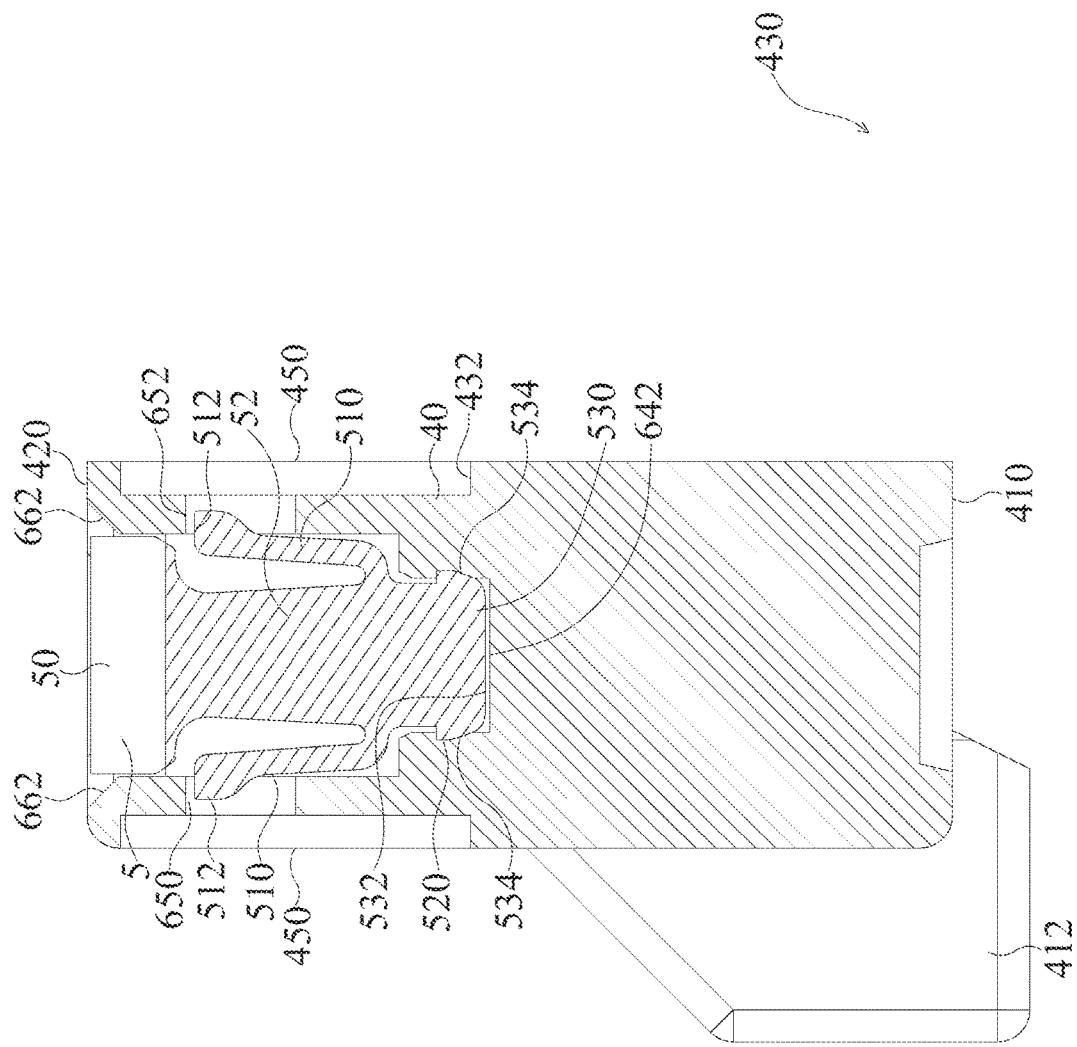
FIG. 9 is a cross-sectional plan schematic view viewed from a angle facing the cross section of FIG. 6.

FIG. 9 is a cross-sectional plan schematic view as viewed from an angle facing the cross section of FIG. 6. Referring to FIG. 9, the fixed portion 520 of the plate body 52 of the metal keycap 5 further includes interference protrusions 534 which are used to interference fix with a wall surface of the fixing recess 640 of the plate body receiving portion 60. Therefore, the holding force between the metal keycap 5 and the insulating housing 40 is relatively high to prevent the metal keycap 5 from loosening and separating from the insulating housing 40.

Figure 10:
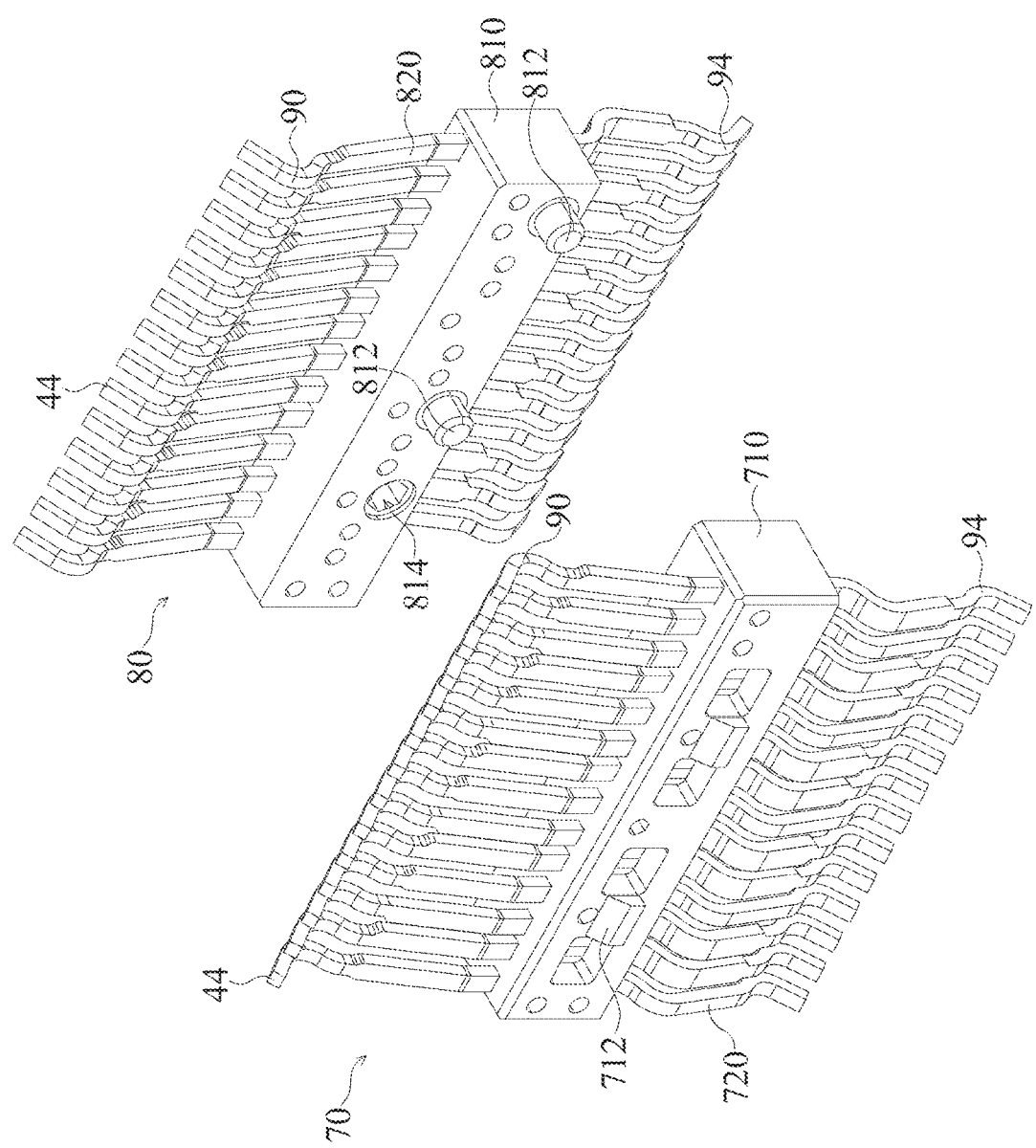
FIG. 10 is an exploded perspective schematic view of a terminal assembly of the board edge connector of FIG. 3.

FIG. 10 is an exploded perspective schematic view of a terminal assembly of the board edge connector 4 of FIG. 3. Referring to FIG. 3 and FIG. 10, in the embodiment, the terminals 44 are divided into four groups of terminals. A difference between the four groups of terminals is essentially the number of the terminals 44. Each group of terminals can be further divided into a first terminal group 70 and a second terminal group 80 which face each other and close to each other.

The first terminal group 70 includes a plurality of first terminals 720 provided in a first insulating element 710 by insert molding.

The second terminal group 80 includes a plurality of second terminals 820 provided in a second insulating element 810 by insert molding. A wall surface of the second insulating element 810 facing the first insulating element 710 includes two positioning posts 812 and a positioning hole 814, and a wall surface of the first insulating element 710 facing the second insulating element 810 includes two positioning holes (not shown) cooperating with the two positioning posts 812 respectively and a positioning post (not shown) cooperating with the positioning hole 814. However, the present disclosure is not limited thereto. In other embodiments, the first terminal group 70 and the second terminal group 80 may be combined by other combination manner, or each terminal 44 may be fixed to the insulating housing 40 by a pin stitching manner The first insulating element 710 and the second insulating element 810 each further include a plurality of latching blocks 712 which can latch to latching holes 470 provided in the insulating housing 40 respectively.

While the present disclosure and advantages thereof are described in detail, it is understood that various changes, replacements and substitutions may be made without departing from the spirit and scope of the present disclosure defined by the appended claims. For example, many processes described above can be implemented in a variety of ways, and many processes described above can be replaced with other processes or combinations thereof.

Further, the scope of the present disclosure is not limited to the specific embodiments of process, machinery, manufacturing, substance composition, means, method or step described in the specification. Those skilled in the art can understand from the disclosed contents of the present disclosure that existing or future developed process, machinery, manufacturing, substance composition, means, method or step which has the same function or achieve essentially the same result as the corresponding embodiment described herein can be used in accordance with the present disclosure. Accordingly, such a process, machinery, manufacturing, substance composition, mean, method or step is included in the technical solution of the present disclosure.

The invention claimed is:

1. A board edge connector comprising:
an insulating housing which has an elongated shape extending in a length direction and comprising a board edge slot extending in the length direction, two side walls extending in the length direction and forming the board edge slot and at least one key integrally configured in the board edge slot and extending in a width direction, the key comprising a top portion and two surfaces opposite to each other in the length direction, a plate body receiving portion being provided alongside each of the two surfaces of the key, and the plate body receiving portion comprising a holding recess;
a plurality of terminals which are mounted in the insulating housing; and
a metal keycap which sheathes the key along a downward direction facing the key and comprises a top surface covering the top portion of the key, plate bodies respectively received in the two plate body receiving portions and an elastic holding arm positioned on at least one side of the plate body, the elastic holding arm latching to the holding recess of the plate body receiving portion, wherein the holding recess of the plate body receiving portion comprises a holding shoulder positioned in the holding recess and facing downwardly and a holding end is a tip of the elastic holding arm and is latched to the holding shoulder in the holding recess of the plate body receiving portion.

2. The board edge connector of claim 1, wherein
the elastic holding arm of the metal keycap is a single cantilever structure with a lower end connected to a side edge of the plate body of the metal keycap and extending obliquely upwardly.

3. The board edge connector of claim 2, wherein
the plate body receiving portion of the insulating housing comprises guide grooves provided on the side walls,
two sides of the plate body of the metal keycap are respectively positioned in the guide grooves, and the holding recess of the plate body receiving portion is provided in the guide groove of the plate body receiving portion.

4. The board edge connector of claim 3, wherein
the guide groove has an open end facing upwardly,
the open end comprises:
a first guide surface which is an oblique surface and is configured to guide the elastic holding aim of the metal keycap in the width direction; and
a second guide surface which is an oblique surface and is configured to guide the plate body of the metal keycap in the length direction.

5. The board edge connector of claim 4, wherein the holding recess of the plate body receiving portion penetrates the side wall of the insulating housing.

6. The board edge connector of claim 1, wherein
the plate body receiving portion of the insulating housing further comprises a fixing recess which is provided to a bottom portion of the plate body receiving portion of the insulating housing, and
the metal keycap of plate body comprises a fixed portion which interference fixes with the fixing recess of the plate body receiving portion.

7. The board edge connector of claim 6, wherein
the board edge slot comprises an inner bottom surface, the fixing recess of the plate body receiving portion comprises a bottom edge, and the plate body of the metal keycap comprises a bottom edge,
the bottom edge of the fixing recess of the plate body receiving portion and the bottom edge of the plate body of the metal keycap extend beyond the inner bottom surface of the board edge slot.

8. The board edge connector of claim 7, wherein the fixed portion comprises interference protrusions which interference fix with a wall surface of the fixing recess of the plate body receiving portion.

9. The board edge connector of claim 6, wherein a total width of the fixed portion of the metal keycap in the width direction is smaller than a distance between the holding ends of the elastic holding arms on the two sides of the plate body.

* * * * *